United States Patent
Armatorio et al.

(10) Patent No.: US 10,137,317 B2
(45) Date of Patent: Nov. 27, 2018

(54) AIRCRAFT AIR SUPPLY SYSTEMS FOR REDUCING EFFECTIVE ALTITUDE EXPERIENCED AT SELECTED LOCATIONS

(71) Applicant: The Boeing Company, Chicago, IL (US)

(72) Inventors: Andrew L. Armatorio, Everett, WA (US); Richard J. Loftis, Arlington, WA (US); Colin W. Hart, Everett, WA (US); Lisa C. Thomas, Kirkland, WA (US); Kevin R. Price, Covington, WA (US)

(73) Assignee: THE BOEING COMPANY, Chicago, IL (US)

( * ) Notice: Subject to any disclaimer, the term of this patent is extended or adjusted under 35 U.S.C. 154(b) by 234 days.

(21) Appl. No.: 14/620,422

(22) Filed: Feb. 12, 2015

(65) Prior Publication Data
US 2015/0157883 A1   Jun. 11, 2015

Related U.S. Application Data

(63) Continuation-in-part of application No. 13/893,966, filed on May 14, 2013.

(51) Int. Cl.
*A62B 7/14*    (2006.01)
*A62B 18/10*   (2006.01)
(Continued)

(52) U.S. Cl.
CPC .............. *A62B 7/14* (2013.01); *A62B 7/08* (2013.01); *A62B 9/003* (2013.01); *A62B 18/02* (2013.01);
(Continued)

(58) Field of Classification Search
CPC .. A62B 7/14; A62B 7/08; A62B 18/02; A62B 18/10; B64D 2013/0662
See application file for complete search history.

(56) References Cited

U.S. PATENT DOCUMENTS 2,900,890 A    8/1959  Fischer et al.
2,929,377 A    3/1960  Cummins
(Continued)

FOREIGN PATENT DOCUMENTS

DE    102007018773 A1    10/2008
EP       2 803 582 A2    11/2014
EP        2803582 A2     11/2014

OTHER PUBLICATIONS

Benningfield, Damond, "Safer Fuel Tanks", Air & Space Magazine, Jul. 2004, pp. 1-4.
(Continued)

*Primary Examiner* — Timothy Stanis
(74) *Attorney, Agent, or Firm* — MH2 Technology Law Group LLP

(57) ABSTRACT

A system for delivering oxygen enriched air to a selected location on an aircraft may include: a gas separation system configured to output a flow of the oxygen enriched air; an environmental control system configured to output a flow of conditioned air; and/or first, second, and third ducts. The first duct may be configured to direct the flow of the oxygen enriched air to the third duct. The second duct may be configured to direct the flow of the conditioned air to the third duct. The conditioned air and the oxygen enriched air may be mixed in the third duct. The third duct may be configured to direct the mixed conditioned and oxygen enriched air to at least one dispensing station at the selected location that is configured to dispense the mixed conditioned and oxygen enriched air to users of the at least one dispensing station.

20 Claims, 4 Drawing Sheets

(51) Int. Cl.
- *A62B 7/08* (2006.01)
- *A62B 9/00* (2006.01)
- *A62B 18/02* (2006.01)
- *A62B 18/04* (2006.01)
- *B64D 13/06* (2006.01)
- *B64D 37/32* (2006.01)

(52) U.S. Cl.
CPC .............. *A62B 18/04* (2013.01); *A62B 18/10* (2013.01); *B64D 13/06* (2013.01); *B64D 37/32* (2013.01); *B64D 2013/0677* (2013.01); *B64D 2013/0681* (2013.01); *Y02T 50/56* (2013.01)

(56) References Cited

U.S. PATENT DOCUMENTS

| | | |
|---|---|---|
| 3,177,679 A | 4/1965 | Quick et al. |
| 3,217,730 A | 11/1965 | Banning, Jr. |
| 4,166,448 A | 9/1979 | Miller et al. |
| 4,262,495 A * | 4/1981 | Gupta ............... B64D 13/06 62/172 |
| 4,312,153 A | 1/1982 | Parkinson et al. |
| 4,428,372 A | 1/1984 | Beysel et al. |
| 4,655,194 A | 4/1987 | Nooden |
| 4,681,602 A | 7/1987 | Glenn et al. |
| 4,893,615 A | 1/1990 | Khabirova |
| 5,025,642 A | 6/1991 | Brunskill et al. |
| 5,169,415 A | 12/1992 | Roettger et al. |
| 5,199,423 A | 4/1993 | Harral et al. |
| 5,214,935 A | 6/1993 | Brunskill |
| 5,351,682 A | 10/1994 | Foote |
| 5,460,175 A | 10/1995 | Foote et al. |
| 5,531,220 A | 7/1996 | Cassidy |
| 5,565,017 A | 10/1996 | Kang et al. |
| 5,791,982 A | 8/1998 | Curry et al. |
| 5,944,284 A | 8/1999 | Bardel |
| 6,142,142 A | 11/2000 | Woodall, III et al. |
| 6,701,923 B2 | 3/2004 | Cazenave et al. |
| 6,955,710 B2 | 10/2005 | Lessi et al. |
| 6,997,970 B2 | 2/2006 | Crome |
| 7,051,731 B1 * | 5/2006 | Rogerson ............ A61M 15/009 128/200.23 |
| 7,081,153 B2 | 7/2006 | Leigh et al. |
| 7,115,152 B2 | 10/2006 | Friday et al. |
| 7,179,322 B2 | 2/2007 | Lyons et al. |
| 7,481,214 B2 | 1/2009 | Eilers |
| 7,624,732 B2 | 12/2009 | Mitchell et al. |
| 7,625,434 B2 | 12/2009 | Tom et al. |
| 7,784,462 B2 * | 8/2010 | Vogt ................ A62B 7/14 128/201.23 |
| 7,789,346 B2 | 9/2010 | Horstman et al. |
| 8,015,973 B2 | 9/2011 | Geary |
| 8,074,927 B2 | 12/2011 | Markwart |
| 8,936,671 B2 | 1/2015 | Horstman et al. |
| 9,089,721 B1 | 7/2015 | Horstman et al. |
| 9,114,869 B1 | 8/2015 | Barrett et al. |
| 2004/0035411 A1 | 2/2004 | Livchak et al. |
| 2005/0173017 A1 | 8/2005 | Moravec et al. |
| 2006/0171845 A1 | 8/2006 | Martin et al. |
| 2007/0046078 A1 * | 3/2007 | Humfeldt ............ A47B 83/00 297/142 |
| 2007/0062371 A1 * | 3/2007 | Eilers ................. A62B 7/14 95/138 |
| 2007/0087677 A1 | 4/2007 | Morris et al. |
| 2007/0221199 A1 | 9/2007 | Hake et al. |
| 2007/0245751 A1 | 10/2007 | Kulcke et al. |
| 2008/0149770 A1 | 6/2008 | Hoffjann et al. |
| 2009/0032011 A1 | 2/2009 | Livchak et al. |
| 2009/0044800 A1 * | 2/2009 | Jorn ................ A62B 7/14 128/203.12 |
| 2009/0093210 A1 | 4/2009 | Livchak et al. |
| 2010/0024821 A1 * | 2/2010 | Rittner ............ B64D 10/00 128/204.29 |
| 2010/0043794 A1 | 2/2010 | Saito et al. |
| 2011/0004151 A1 * | 1/2011 | Simonsen ........... A61M 35/00 604/23 |
| 2012/0055275 A1 | 3/2012 | Lambertson |
| 2012/0055460 A1 | 3/2012 | Lambertson |
| 2012/0196521 A1 * | 8/2012 | Geary ............... B64D 13/06 454/75 |
| 2012/0322358 A1 | 12/2012 | Wendorski et al. |
| 2013/0312744 A1 * | 11/2013 | Kshirsagar ........... B64D 11/00 128/202.26 |
| 2013/0341465 A1 | 12/2013 | Massey et al. |

OTHER PUBLICATIONS

The Boeing Company, "Fuel", The Boeing 737 Technical Guide updated Feb. 24, 2013, downloaded from http://www.b737.org.uk/fuel.htm on Mar. 8, 2013, pp. 1-13.
Extended European Search Report dated Jun. 29, 2016, from European Application No. 15 190 370.5; 8 pgs.
European Office Action dated Jul. 21, 2017, in EP Application No. 15 190 370.5, 7 pages.
Office Action dated Nov. 2, 2017, in U.S. Appl. No. 14/620,553, 58 pages.
Non-Final Office Action dated Nov. 6, 2015, for U.S. Appl. No. 13/893,966.
Non-Final Office Action dated Mar. 11, 2016, for U.S. Appl. No. 13/893,966.
Final Office Action dated Jul. 1, 2016, for U.S. Appl. No. 13/893,966.
Non-Final Office Action dated Aug. 10, 2017, for U.S. Appl. No. 13/893,966.
Non-Final Office Action dated Oct. 5, 2017, U.S. Appl. No. 13/893,966.
Extended European Search Report dated Apr. 28, 2015, from corresponding European Application No. 14168357.3 (6 pp.).
Non-Final Office Action dated Apr. 5, 2018, for U.S. Appl. No. 13/893,966.
Final Office Action dated Apr. 18, 2018, for U.S. Appl. No. 14/620,553.
Official Action dated Sep. 5, 2018, in corresponding Canadian Application No. 2,914,150.

* cited by examiner

AIRCRAFT AIR SUPPLY SYSTEMS FOR REDUCING EFFECTIVE ALTITUDE EXPERIENCED AT SELECTED LOCATIONS

CROSS REFERENCE

This application is a continuation-in-part of and claims priority to application Ser. No. 13/893,966 filed May 14, 2013 entitled AIRCRAFT AIR SUPPLY SYSTEM FOR REDUCING AN EFFECTIVE ALTITUDE OF A FLIGHT DECK.

FIELD

The present disclosure relates to aircraft and controlling the atmospheric conditions within aircraft, and more particularly to an aircraft air supply system for reducing the effective altitude experienced by an individual at selected locations on an aircraft.

BACKGROUND

As altitude increases, atmospheric pressure decreases. Low pressure areas (i.e. at high altitudes) have less atmospheric mass, whereas higher pressure areas have greater atmospheric mass. Therefore, most modern aircraft and in particular, commercial passenger aircraft have pressurized cabins that reduce the effective altitude experienced within the aircraft, while flying at higher altitudes. When an aircraft's cabin and flight deck's effective altitudes are reduced, the total pressure of the interior of the aircraft is increased. This leads to a higher differential pressure between the inside and outside of the aircraft, with the stress becoming greater as the differential pressure increases. In order to reduce the effective altitude within the airplane, either the structure of the aircraft would need to be redesigned or adjusted to safely withstand the higher pressure, or the aircraft is flown at a lower altitude. Also, aircraft flown at higher differential pressures require increased maintenance and inspection, which will result in increased cost.

The effective altitude within the aircraft experienced by users such as passengers, at selected locations on the aircraft, can be reduced, without increasing the total pressure, by increasing the oxygen partial pressure in those locations, to an equivalent lower altitude value. Low oxygen and humidity levels which may be encountered during flight at increased effective cabin altitudes in an aircraft, may contribute to various adverse health effects, including light-headedness, loss of appetite, shallow breathing and difficulty in concentrating. For example, ascent from ground level to 8000 ft. pressure altitude lowers oxygen saturation in the blood by ~4% (e.g. Muhm 2007). Dehydration is another adverse health effect, due to the dryness of the air. A human's preferred level is approximately 40-60% relative humidity, and in-flight humidity can drop below 10%. A dry thin atmosphere can also cause disturbed sleep patterns and can result in lack of energy, headaches, nausea, and loss of appetite.

Many commercial and other aircraft are equipped with gas separation systems such as nitrogen generating systems (NGS) to generate nitrogen enriched air that is channeled into parts of the aircraft, such as fuel tanks, for creating an inert atmosphere. The nitrogen generating system also produces oxygen enriched air. However, the oxygen enriched air from the nitrogen generating system is not used, typically being released overboard. The nitrogen generating system can receive bleed air flowing from at least one engine of the aircraft, or from a compressor or other source on board the aircraft. During all phases of flight, a portion of the air flow used in the nitrogen generating system is discarded in the form of oxygen enriched air. The air that is released overboard without being used causes an unnecessary drain on the aircraft systems reducing efficiency.

SUMMARY

In accordance with an implementation of the technology as disclosed, oxygen enriched air can be routed from a gas separation system, such as a nitrogen generating system (NGS), to one or more locations on a vehicle which may be an aircraft. An oxygen station having individual outputs for users, such as passengers, can be on an air delivery system that is separate from the air delivery system for the passenger cabin and other parts of the aircraft. A system for delivering oxygen enriched air to one or more selected locations can include a gas separation system having an oxygen output channel that outputs a flow of oxygen enriched air, and a duct network coupled to the oxygen output channel to direct the flow of oxygen enriched air to at least one dispensing station at a selected location that dispenses the flow of oxygen enriched air to users.

An apparatus for delivering oxygen enrichment to a location on the aircraft can include a dispensing station having a dispenser configured to dispense a flow of oxygen enriched air at the location and said dispensing station can have an input coupled to a duct network and the input can be configured to receive the flow of oxygen enriched air received from an output of a gas separation system.

In accordance with another implementation of the technology, one implementation can include a method for delivering oxygen enriched air to a location on an aircraft comprising directing a flow of oxygen enriched air from an oxygen output of a gas separation system through a duct network to a dispenser configured to dispense the flow of oxygen enriched air at a location, and dispensing the oxygen enriched air to a plurality of dispensing stations at locations on the aircraft. The dispenser can be a manifold configuration that distributes the flow of oxygen enriched air through a plurality of separate channels where each is in fluid communication with one of the plurality of dispensing stations. Each of the plurality of dispensing stations can have an individual dispensing implement for delivering the oxygen enriched air to the user where the implement can be selected from a group including one or more of a vent, hood, nozzle, valve, a tube, a mask, and a helmet.

In accordance with an implementation of the technology as disclosed, an aircraft air supply system may include a duct to supply an oxygen enriched air flow to a flight deck of an aircraft. A gas separation system such as an aircraft Nitrogen Generating System ("NGS") may be configured for generating nitrogen enriched air and oxygen enriched air. A secondary duct may be provided for channeling the oxygen enriched air from the nitrogen generating system to the duct. The flow of the oxygen enriched air into the duct and to the flight deck may be controlled to reduce the effective altitude experienced by persons on the flight deck. The flow of the oxygen enriched air through the duct can also be channeled to dispensing stations. A control can be provided at the dispensing station for controlling the flow of oxygen enriched air dispensed in each dispensing station. A passenger communal area can include a plurality of dispensing station, where each dispensing station includes a user support device, a counter and individual dispensing implements.

In accordance with another implementation of the technology as disclosed a NGS may be configured for generating nitrogen enriched air and oxygen enriched air. An environmental control system may be configured to channel oxygen enriched air to one or more locations on the aircraft. A duct in flow communication with the environmental control system and the flight deck may supply a flow of oxygen enriched air to the flight deck. A secondary duct is in flow communication with the nitrogen generating system and the duct. The secondary duct may be configured to channel the flow of oxygen enriched air from the nitrogen generating system to the duct to reduce the effective altitude experienced by users at one or more locations on the aircraft.

In accordance with further implementation of the technology as disclosed, a method for reducing an effective altitude experienced by users in an aircraft may include supplying a primary air flow to the flight deck of the aircraft through a primary duct. The method may also include generating nitrogen enriched air and oxygen enriched air by a NGS. The method may additionally include channeling the oxygen enriched air from the nitrogen generating system to the duct through a secondary duct. A flow of the oxygen enriched air into the primary duct and to the flight deck may be controlled to reduce the effective altitude experienced by users at one or more locations on the aircraft.

In accordance with one implementation a method for delivering oxygen enriched air to a selected location on an aircraft can be provided by directing a flow of oxygen enriched air from an oxygen output of a gas separation system on an aircraft to a dispensing station that dispenses the flow of oxygen enriched air at one or more locations on the aircraft; dispensing the oxygen enriched air to one or more locations in an aircraft. The gas separation system can be a nitrogen generation system on an aircraft.

In accordance with yet a further implementation of the technology as disclosed, oxygen enriched air is routed from a NGS to one or more locations on an aircraft. The locations are on an air delivery system that may be separate from the air delivery system for the other locations of the aircraft. Because the locations and their associated delivery systems have a smaller volume than the volume of the other areas of the aircraft, the oxygen enriched air makes a noticeable difference in the effective altitude experienced by the users at the locations. In the exemplary embodiment, the delivery systems for the locations may include a primary duct and a secondary duct in flow communication between the nitrogen generating system and the primary duct. The secondary duct may extend from the oxygen enriched air outlet of the nitrogen generating system to the primary duct upstream of any mixers and/or sensors associated with the primary duct. The oxygen enriched air flow mixes with the air flow within the primary duct. A check valve may be coupled to the secondary duct to prevent oxygen enriched air from flowing back towards the NGS. Further, no additional oxygen generators may be needed, because the oxygen enriched air is only being selectively channeled to the selected locations and can be turned on and off during flight.

BRIEF DESCRIPTION OF DRAWING

The following detailed description of the implementations of the technology as disclosed refers to the accompanying drawings, which illustrate specific implementations of the disclosure. Other implementations having different structures and operations do not depart from the scope of the present disclosure.

DESCRIPTION

Figure 1:
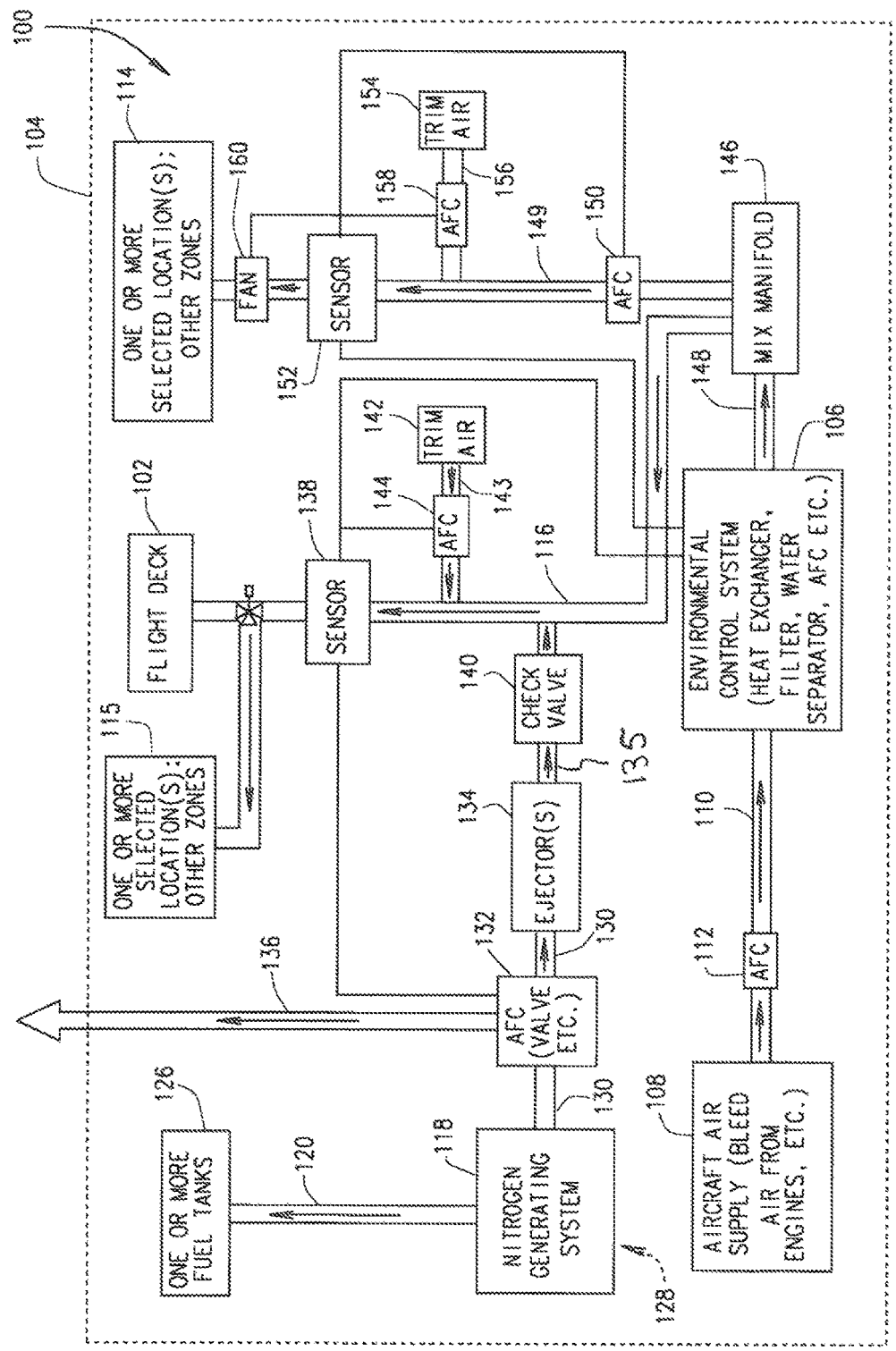
FIG. 1 is block schematic diagram of an example of an aircraft air supply system including features for reducing the effective altitude experienced by users at selected location on an aircraft, in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is block schematic diagram of an example of an aircraft air supply system 100 including features for reducing the effective altitude experienced by users of a flight deck 102 and a main cabin 114 of an aircraft 104 in accordance with an embodiment of the present disclosure. An aircraft environmental control system 106 may receive a flow of air from an aircraft air supply 108 through a duct 110 or channel in flow communication between the aircraft air supply 108 and the environmental control system 106. The aircraft air supply 108 may include or may be bleed air from one or more engines of the aircraft 104, air from another source, or a combination of bleed air from one or more engines and air from another source, such as an onboard oxygen generating system. An air flow control device 112 may control or regulate the flow of air through the duct 110 from the aircraft air supply 108 to the environmental control system 106. The air flow control device 112 may include a valve, baffle or other mechanism to control a volume or flow of air in the duct 110. The air flow control device 112 may control the air flow in the duct 110 in response to signals from one or more sensors (not shown in FIG. 1) that may be associated with the duct 110, environmental control system 106 or both.

The environmental control system 106 may be configured to channel oxygen enriched air to at least one location such as the flight deck 102 or one or more other selected locations in the passenger compartment 115 in the aircraft 104. The environmental control system 106 may condition the air for use in the flight deck 102, and main cabin 114 in the aircraft 104. For example, the environmental control system 106 may include, but is not necessarily limited to, including a heat exchanger, air conditioning packs or similar devices to adjust the oxygen enriched air to an appropriate temperature; a filter to remove any foreign substances that may be in the air; a water separator to remove any moisture or water vapor that may be in the air; and any other features or components to condition the oxygen enriched air for use in the aircraft 104.

The aircraft air supply system 100 may include a duct 116 to supply a primary air flow to the flight deck 102 of the aircraft 104. The duct 116 may be in flow communication with the environmental control system 106 and the flight deck 102 for supplying the flow of air to the flight deck 102.

The aircraft 104 may also include a nitrogen generating system 118 that may be configured for generating nitrogen enriched air and oxygen enriched air. The gas separation system can be a nitrogen generation system (NGS) on an aircraft. However, other types of onboard gas separation systems having an oxygen output can be utilized. The nitrogen generating system 118 may receive bleed air from one or more engines of the aircraft 104, from other sources, or both. The nitrogen enriched air generated by the nitrogen generating system 118 may be directed through a duct 120 or channel to one or more fuel tanks 126 of the aircraft 104 to replace air in the fuel tanks as fuel is consumed during flight to create an inert atmosphere or environment within the fuel tanks 126. The nitrogen enriched air may also be channeled from the nitrogen generating system 118 to other areas of the aircraft 104 where an inert environment or atmosphere may be desired or needed. The nitrogen generating system 118, duct 120, and any other ducts or components may define an inert gas system 128 that channels the nitrogen enriched air to the fuel tanks 126 of the aircraft 104 and/or any other areas of the aircraft 104.

The aircraft air supply system 100 may also include a secondary duct 130 in flow communication with the nitrogen generating system 118 and the duct 116. The secondary duct 130 is configured to channel the flow of oxygen enriched air from the nitrogen generating system 118 to the duct 116 to reduce the effective altitude experienced by users such as passengers or crew at selected locations on aircraft 104. The flow of oxygen enriched air into the duct 116 may be controlled to reduce the effective altitude of the flight deck 102 to a desired level. An air flow control device 132 in the secondary duct 130 may control a volume of oxygen enriched air that flows through the secondary duct 130 into the duct 116 and that flows into an overboard discharge duct 136. A sensor 138 may sense the volume, percentage of volume or partial pressure, or other appropriate measurable characteristics of the oxygen enriched air flowing in the duct 116 and the air flow control device 132 based on inputs from the sensor 138 may control a percentage of volume of oxygen enriched air flowing in each of the secondary duct 130 and the overboard discharge duct 136. The air flow control device 132 may be a valve, controllable baffle or other mechanism to selectively divide the air flow between the secondary duct 130 and the discharge duct 136.

An ejector or series of ejectors 134 may be coupled to the secondary duct 130 or a secondary duct portion 135 of the secondary duct 130. The ejector or series of ejectors 134 may be disposed within the secondary duct 130 at an entrance to the secondary duct portion 135. The ejector or series of ejectors 134 may boost the pressure of the oxygen enriched air before entering the primary duct 116 to the flight deck 102. The ejector or series of ejectors 134 may also be part of or may be considered part of the air flow control device 132. The ejector(s) 134 can be an ejector, a turbocompressor, or another system to boost the pressure of the oxygen enriched air.

The aircraft air supply system 100 may additionally include a check valve 140 coupled to the secondary duct portion 135 downstream of the air flow control device 132 and ejector(s) 134. The check valve 140 may prevent air from flowing back towards the nitrogen generating system 118.

The secondary duct 130 or secondary duct portion 135 is connected into the primary duct 116 at a location to inject the oxygen enriched air into the primary duct 116 sufficiently upstream of the flight deck 102 air supply exits such that the main aircraft air supply and oxygen enriched air flows have sufficient distance to mix naturally without a mechanism for mixing the flows. Alternatively, the oxygen enriched air may be mixed with the main aircraft air supply using a device such as a fan. In other implementations the oxygen enriched air is not mixed with the main aircraft air supply.

Trim air 142 may also be directed into the primary duct 116 by a trim air duct 143. Trim air 142 is essentially hot pure bleed air that has not gone through the air conditioning packs of the environmental control system 106. The trim air 142 serves to control the temperature of the air being distributed to the flight deck 102 and the main cabin 114 or passenger compartment 115. The trim air 142 mixes with the cold air coming off the air conditioning packs of the environmental control system 106 to provide the desired temperature. The trim air 142 flowing into the primary duct 116 may be controlled by another air flow control device 144. The air flow control (AFC) device 144 may be controlled by the sensor 138 or by another sensor associated with the primary duct 116 supplying airflow to the flight deck 102. The air flow control device 144 may be similar to the air flow control device 132.

In one implementation, the aircraft air supply system 100 may additionally include a mix manifold 146 to receive air flowing through at least one duct 148 from the environmental control system 106. The mix manifold 146 may distribute the airflow to the passenger compartment 115 which may include multiple cabin zones or areas, and other areas of the aircraft. The distribution of airflow from the mix manifold 146 may be through multiple environmental air supply ducts. However, for purposes of explanation and clarity, only a single exemplary environmental air supply duct 149 is shown in FIG. 1. Other air supply ducts may have a similar configuration. The air supply duct 149 may include an air flow control device 150 similar to the airflow controllers previously described. The volume or flow of air through the air flow control device 150 may be controlled by a sensor 152. The sensor 152 may also be electrically connected to the environmental control system 106 for overall operation and control of the aircraft air supply system 100.

Trim air 154 may also be directed into the duct 149 through another duct 156. The flow of the trim air 154 into the air supply duct 149 may be controlled by another airflow control device 158. The airflow control device 158 may be controlled by the sensor 152 or by another similar sensor. A fan 160 may be provided to drive the re-circulated air in the passenger compartment 115 or main cabin 114. The fan 160 may be controlled by a sensor 152 or by manual controls.

Figure 2:
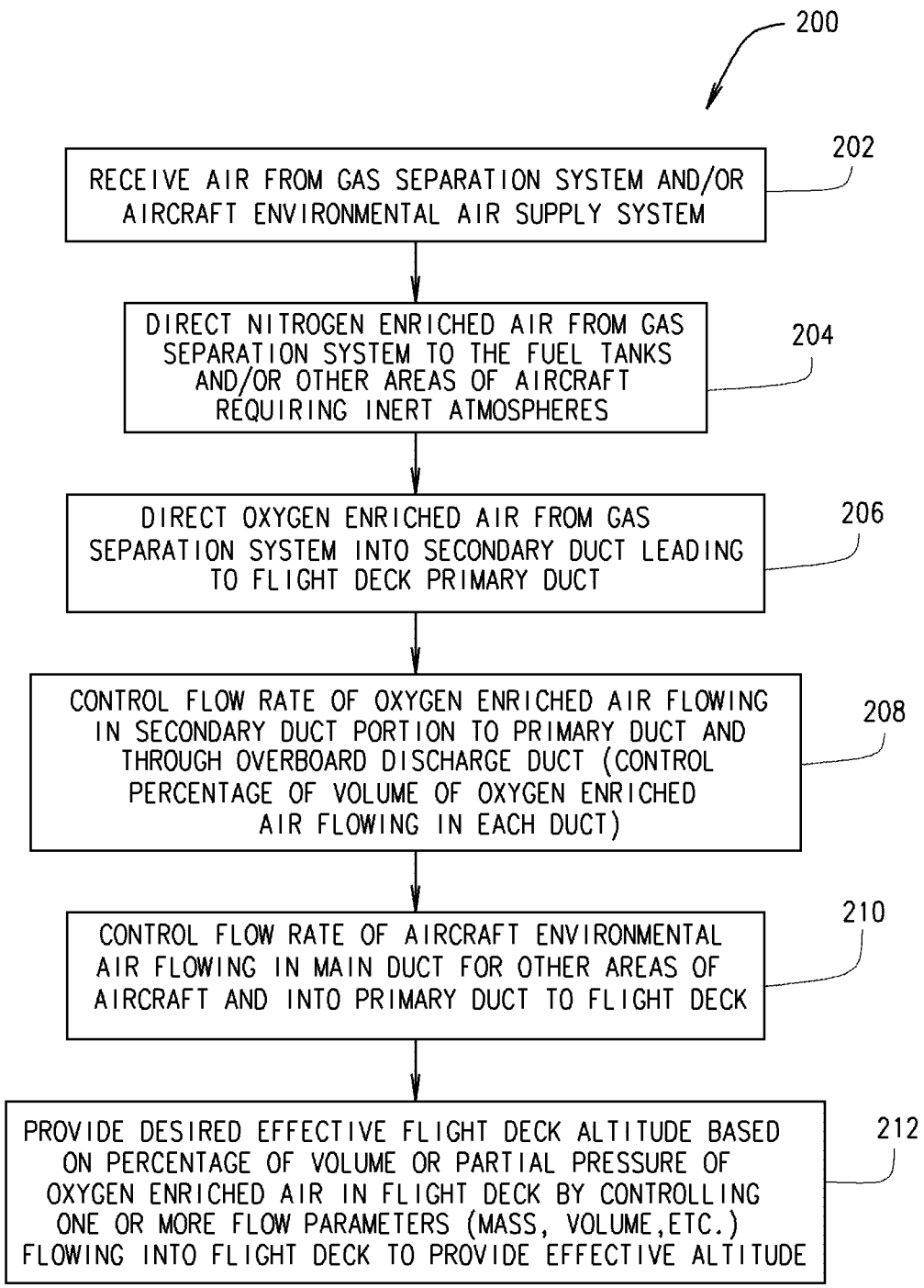
FIG. 2 is a flow chart of an example of a method for reducing the effective altitude experienced by users at selected locations in an aircraft, in accordance with an embodiment of the present disclosure.

FIG. 2 is a flow chart of an example of a method 200 for reducing the effective altitude of a flight deck and at least one additional location on an aircraft in accordance with an embodiment of the present disclosure. The method 200 may be performed by the aircraft air supply system 100 in FIG. 1 or a similar air supply system. In block 202, bleed air may be received by a nitrogen generating system and by an aircraft environmental air supply system from one or more engines of an aircraft. Alternatively, air may be received by the nitrogen generating system from one or more other sources or from both bleed air from the engines and other sources.

In block 204, nitrogen enriched air from the nitrogen generating system may be supplied or directed to a fuel tank oxygen replacement system or directly to the fuel tank or tanks. The nitrogen enriched air is used to create an inert atmosphere in the fuel tank or tanks as fuel is consumed by the aircraft. The nitrogen enriched air may also be supplied to other areas of the aircraft where inert atmospheres may be desirable or needed.

In block 206, oxygen enriched air from the nitrogen generating system may be supplied or channeled into a secondary duct in flow communication with a primary duct that supplies primary air to the flight deck of the aircraft.

In block 208, the flow or volume of oxygen enriched air flowing in the secondary duct to the duct may be controlled to reduce an effective altitude of the flight deck or other locations on the aircraft. The remainder of the aircraft may be maintained at a higher effective altitude than the flight deck or other locations supplied with oxygen enriched air. Any oxygen enriched air not flowing through the secondary duct portion to the primary duct may be discharged overboard through an overboard discharge duct. Similarly, as previously described, the percentage of oxygen enriched air flowing in the secondary duct and the overboard discharge duct may be controlled by a sensor in the primary duct controlling the operation of an airflow control device, such as a valve, baffle or other device for dividing the airflow of the oxygen enriched air into the different ducts.

In block 210, the flow or volume of aircraft environmental air flowing in a main duct to other areas of the aircraft and into the primary duct to the flight deck may be controlled. The flow of the air in each of the ducts may be controlled by an airflow control device and associated sensor similar to that previously described.

In block 212, a desired effective altitude may be provided based on the flow rate of oxygen enriched air received from the individual dispensers at the dispensing stations at selected locations in the aircraft. The percentage of mass, volume, partial pressures, and/or flow or other measurable characteristics of oxygen enriched air channeled to the flight deck and/or at least one other selected location, may be controlled to provide the desired effective altitude experienced in the selected location. The percentage of volume or partial pressure of the oxygen enriched air may be controlled by airflow control devices and associated sensors similar to that previously described or by other mechanisms.

Figure 3A:
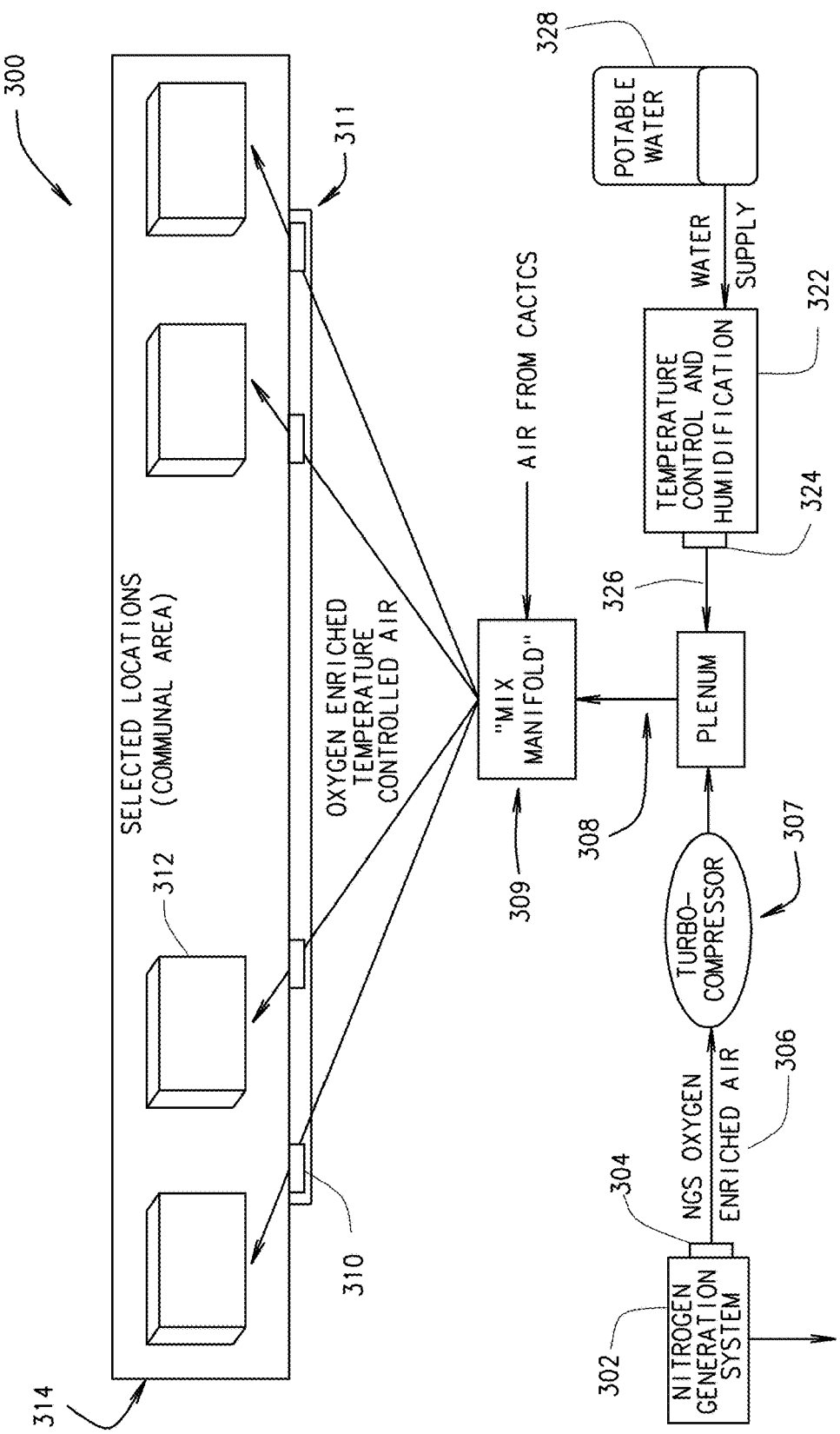
FIG. 3A is an illustration of an aircraft air supply system for delivering oxygen enriched air to selected locations on an aircraft.
Figure 3B:
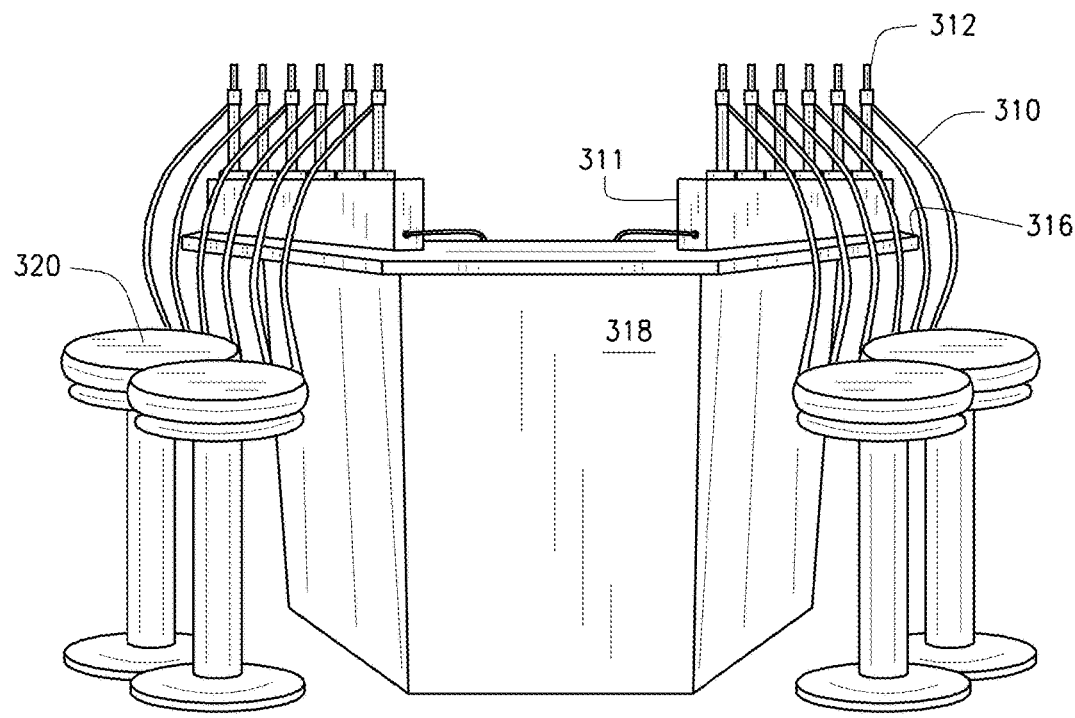
FIG. 3B is an illustration of a selected location on an aircraft.

Referring to FIGS. 3A and 3B, yet another implementation of the technology is shown where the implementation is a system 300 for delivering oxygen enriched air to at least one dispensing station 312 such as an "oxygen bar," at one or more selected locations 314 on the aircraft. A gas separation system 302, such as a nitrogen generating system (NGS), having an oxygen output channel 304 that outputs a flow of oxygen enriched air 306, is illustrated. A control/valve can be utilized to distribute the oxygen enriched air to different communal areas of the aircraft. In one implementation of the technology a duct network 308 can be coupled to the oxygen output channel 304 and the duct network can be configured to direct the flow of oxygen enriched through a manifold 309 to a dispenser 310 configured to dispense the flow of oxygen enriched air 306 at a dispensing station 312 to one or more users at a selected location 314. The dispenser 310 can be a tube or other type of dispenser. A selected location 314 can be an area within the passenger cabin onboard an aircraft that is sufficiently large, such as a communal area, where two or more users, such as passengers, or crew can gather. The dispenser 310 can be in fluid communication with a manifold 311 that receives the oxygen enriched air flow from the NGS and distributes it through one or more dispensers 310 to one or more dispensing stations 312 in the selected location 314.

As shown in FIG. 3B the dispensing station 312 can include one or more implements (dispensers 310) including a nose cannula (commonly referred to as an oxygen tube or oxygen nose tube), a mask that can cover the nose and mouth of a user, a mouth tube, a nozzle, a valve and a helmet. The implements 310 can be configured to be attached or mounted on a counter 316 or a bar fixture 318. A user such as a passenger can access the dispensing station 312 by appropriately applying the dispensing implement 310 for intake of the oxygen enriched air flow. A selected location can be a passenger communal area where the passenger communal area includes a plurality of dispensing stations 312, and a control for controlling the flow of oxygen enriched air to each dispensing station 312. The dispensing stations 312 may be supplied with a passenger support device such as a bar stool 320, chair, counter, bench or other supportive device. The communal area can be positioned in the passenger cabin or other location on the aircraft.

Because the oxygen-enriched air will be warm, and may be too warm for comfortable inhalation, it may be mixed with the existing aircraft environmental air or cooled using an alternative means such as a temperature regulator, for example, a heat exchanger. The supply of oxygen-enriched air may be directed as desired to one or more locations, for example, directly to an oxygen bar.

Figure 4:
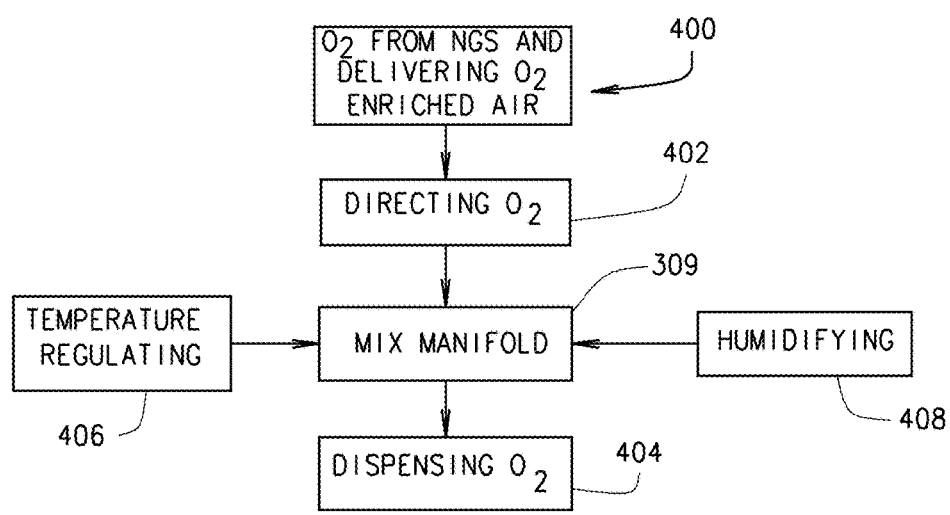
FIG. 4 is an illustration of the process for delivering oxygen enriched air to a selected location on an aircraft.

Yet another implementation of the technology is illustrated in FIGS. 3A and 4, where a temperature control and air humidification system 322 can be utilized to humidify the oxygen enriched air flow. Air humidification system 322 can be utilized having a humidified air output 324 coupled to the duct network and configured to add humidified air 326 to the flow of oxygen enriched air. One implementation of the technology can also include a temperature regulator 406, such as a heat exchanger, coupled to the duct network and configured to control the temperature of the oxygen enriched air. The air humidification system 322 can be coupled to a water source 328, such as an onboard potable water reservoir. In a further implementation, a turbo-compressor 307 can be utilized to improve the overall performance of the gas separation system when the oxygen enriched air is ducted to higher pressures present in the selected locations on the aircraft.

Referring to FIG. 3B, the dispensing station 312 can have an input coupled to a duct network and the input can be configured to receive the flow of oxygen enriched air received from an output of a gas separation system (not shown), and the dispensing station 312 can have one or more individual dispensers 310 configured to dispense a flow of oxygen enriched air to individual users using individual dispensing implements 310. The dispensing station 312 may include one or more of a user support device 320, such as a seat or bench, and a control for controlling the flow of oxygen enriched air. Each of the plurality of dispensing stations 312 can also have an individual flow control (not shown) for controlling the flow rate of oxygen enriched air from the gas separation system to the dispensing station 312. The dispenser 310 can be in a manifold configuration 311 and can have a reservoir (not shown) for temporary storage of oxygen enriched air to act as a buffer to assure the flow of oxygen enriched air to the dispensing station may be provided as a continuous and uninterrupted flow, when desired. Individual user controls (not shown) may be provided for adjusting the flow of the oxygen enriched air in each dispensing implement 310.

Referring to FIG. 4, yet another implementation of the technology is illustrated for providing a method of delivering oxygen enriched air to selected locations 400 including performing the process of directing a flow of oxygen enriched air 402 from an oxygen output of a gas separation system through a duct network to a 02 dispenser 404 configured to dispense the flow of oxygen enriched air at selected locations, and dispensing the oxygen enriched air 402 to a plurality of dispensing stations at the selected location 400. The process of delivering oxygen enriched air includes separating out oxygen enriched air with a gas separation system that can be a nitrogen generation system (NGS) on an aircraft. The process of dispensing the oxygen enriched air includes dispensing oxygen enriched air at a dispensing station in a dispensing implement 310 and where the selected location may include one or more of a user support device 320, and a control for controlling the flow of oxygen enriched air. A user, such as a passenger, can transition from their assigned and/or chosen seating area, for example in the main cabin 114, to the selected location, such as a communal area, to partake of a flow of oxygen enriched air being dispensed at a dispensing station 312. The user can stand or be seated adjacent a dispensing station 312 and appropriately deploy the implement 310 used to dispense oxygen enriched air into their mouth and/or nose. The user can inhale the oxygen enriched air being dispensed at the dispensing station 312. In order to make the oxygen flow more appropriate for inhalation, the oxygen enriched air flow can be temperature adjusted using, for example, a temperature regulator 406 such as a heat exchanger coupled to the duct network. The process can include humidifying the flow of oxygen enriched air 408, for example, by adding a humidified air flow from a humidification system. The process can also include adding scents or flavors to the oxygen enriched air.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for delivering oxygen enriched air to a flight deck on an aircraft and to a selected location on the aircraft, the system comprising:
   a gas separation system configured to output a flow of the oxygen enriched air;
   an environmental control system configured to output a flow of conditioned air; and
   first, second, third, and fourth ducts;
   wherein the first duct is configured to direct the flow of the oxygen enriched air to the third duct,
   wherein the second duct is configured to direct a first portion of the flow of the conditioned air to the third duct,
   wherein the first portion of the flow of the conditioned air and the flow of the oxygen enriched air are mixed in the third duct,
   wherein the third duct is configured to direct the mixed conditioned and oxygen enriched air to the flight deck and to at least one dispensing station at the selected location, the at least one dispensing station at the selected location being configured to dispense the mixed conditioned and oxygen enriched air to users of the at least one dispensing station,
   wherein the fourth duct is configured to direct a second portion of the flow of the conditioned air to a main cabin of the aircraft, and
   wherein the flow of the oxygen enriched air to the third duct is controlled to reduce an effective altitude of the flight deck and of the at lease one dispensing station.

2. The system as recited in claim 1, where the gas separation system comprises a nitrogen generation system on the aircraft.

3. The system as recited in claim 1, where the selected location is a passenger communal area.

4. The system as recited in claim 3, wherein the passenger communal area includes a plurality of dispensing stations.

5. The system as recited in claim 4, wherein each of the plurality of dispensing stations includes a user support device, a counter, and individual dispensing implements.

6. The system as recited in claim 1, further comprising:
   an air humidification system configured to humidify the mixed conditioned and oxygen enriched air.

7. The system as recited in claim 6, where the air humidification system is coupled to a water source.

8. The system as recited in claim 1, further comprising:
   a temperature regulating device configured to regulate a temperature of the mixed conditioned and oxygen enriched air.

9. The system as recited in claim 1, wherein the environmental control system comprises an air humidification system.

10. The system as recited in claim 9, where the air humidification system is coupled to a water source.

11. The system as recited in claim 1, wherein the environmental control system comprises a heat exchanger.

12. The system as recited in claim 1, wherein the environmental control system comprises an air conditioning pack.

13. The system as recited in claim 1, wherein the environmental control system comprises a filter.

14. The system as recited in claim 1, wherein the environmental control system comprises a water separator.

15. A method for delivering oxygen enriched air to a flight deck on an aircraft and to a selected location on the aircraft, the method comprising:
   outputting a flow of the oxygen enriched air from a gas separation system;
   outputting a flow of conditioned air from an environmental control system;
   directing the flow of the oxygen enriched air, using a first duct, to a third duct;
   directing a first portion of the flow of the conditioned air, using a second duct, to the third duct;
   directing a second portion of the flow of the conditioned air, using a fourth duct, to a main cabin of the aircraft;
   mixing the first portion of the flow of the conditioned air and the flow of the oxygen enriched air in the third duct;

directing the mixed conditioned and oxygen enriched air to the flight deck and to at least one dispensing station at the selected location;

dispensing the mixed conditioned and oxygen enriched air to users of the at least one dispensing station; and controlling the flow of the oxygen enriched air to the third duct in order to reduce an effective altitude of the flight deck and of the at least one dispensing station.

16. The method as recited in claim 15, where the gas separation system comprises a nitrogen generation system on the aircraft.

17. The method as recited in claim 15, further comprising: regulating a temperature of the mixed conditioned and oxygen enriched air.

18. The method as recited in claim 15, further comprising: humidifying the mixed conditioned and oxygen enriched air.

19. The method as recited in claim 15, further comprising: adding scents or flavors to the mixed conditioned and oxygen enriched air.

20. A system for delivering oxygen enriched air to a flight deck on an aircraft and to a selected location on the aircraft, the system comprising:

a gas separation system configured to output a flow of the oxygen enriched air;

an environmental control system configured to output a flow of conditioned air;

one or more ejectors; and first, second, third, and fourth ducts;

wherein the first duct is configured to direct the flow of the oxygen enriched air to the one or more ejectors, wherein the one or more ejectors are configured to boost a pressure of the oxygen enriched air and to direct the flow of the pressure-boosted oxygen enriched air to the third duct, wherein the second duct is configured to direct a first portion of the flow of the conditioned air to the third duct, wherein the first portion of the flow of the conditioned air and the flow of the pressure-boosted oxygen enriched air are mixed in the third duct, wherein the third duct is configured to direct the mixed conditioned and pressure-boosted oxygen enriched air to the flight deck and to at least one dispensing station at the selected location, the at least one dispensing station at the selected location being configured to dispense the mixed conditioned and pressure-boosted oxygen enriched air to users of the at least one dispensing station, wherein the fourth duct is configured to direct a second portion of the flow of the conditioned air to a main cabin of the aircraft, and wherein the flow of the pressure-boosted oxygen enriched air to the third duct is controlled to reduce an effective altitude of the flight deck and of the at least one dispensing station.

* * * * *